(12) United States Patent
Tatsuma

(10) Patent No.: US 11,553,104 B2
(45) Date of Patent: *Jan. 10, 2023

(54) INFORMATION PROCESSING APPARATUS CAPABLE OF CONTROLLING A DOCUMENT STORED IN A MEMORY NOT TO LEAK TO A NETWORK NOT PERMITTED TO ACCESS AND NON-TRANSITORY COMPUTER READABLE MEDIUM

(71) Applicant: FUJIFILM Business Innovation Corp., Tokyo (JP)

(72) Inventor: Noriyuki Tatsuma, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/746,918

(22) Filed: May 17, 2022

(65) Prior Publication Data

US 2022/0279085 A1 Sep. 1, 2022

Related U.S. Application Data

(63) Continuation of application No. 16/558,170, filed on Sep. 2, 2019, now Pat. No. 11,363,161.

(30) Foreign Application Priority Data

Sep. 10, 2018 (JP) .............................. JP2018-168450

(51) Int. Cl.
*H04N 1/21* (2006.01)
*G06F 3/12* (2006.01)
*G06F 3/06* (2006.01)

(52) U.S. Cl.
CPC ......... *H04N 1/2166* (2013.01); *G06F 3/0605* (2013.01); *G06F 3/067* (2013.01); *G06F 3/0637* (2013.01); *G06F 3/1204* (2013.01); *G06F 3/1236* (2013.01)

(58) Field of Classification Search
CPC ... H04N 1/2166; G06F 3/0605; G06F 3/0637; G06F 3/067; G06F 3/1204; G06F 3/1236
USPC ........................................................ 358/1.16
See application file for complete search history.

(56) References Cited

U.S. PATENT DOCUMENTS

| | | | | |
|---|---|---|---|---|
| 9,041,956 | B2* | 5/2015 | Kwon ...................... | H04L 45/54 358/1.18 |
| 2011/0131310 | A1* | 6/2011 | Ooba ...................... | G06F 3/121 709/246 |
| 2013/0148162 | A1* | 6/2013 | Park ...................... | H04W 76/15 358/1.15 |

* cited by examiner

*Primary Examiner* — Allen H Nguyen
(74) *Attorney, Agent, or Firm* — JCIPRNET

(57) ABSTRACT

An information processing apparatus includes multiple network interfaces, multiple storage areas for saving data, an obtaining unit, and a presenting unit. The multiple network interfaces are connected to corresponding networks. For each of the multiple storage areas, a network interface permitted as an output path of the saved data is defined. The obtaining unit obtains network information indicating a network available to a group to which each user belongs. The presenting unit presents to a user a list of storage areas selectable as a data storage destination. The presenting unit presents a list of storage areas for which a network interface connected to a network available to the group to which the user belongs, which is indicated by the network information, is defined as the output path.

11 Claims, 13 Drawing Sheets

| NETWORK GROUP ID | NETWORK INTERFACE INFORMATION |
| --- | --- |
| GROUP 1 | LAN1 |
| GROUP 2 | LAN2 |
| GROUP 3 | Wi-Fi |
| GROUP 4 | NONE |
| GROUP 5 | LAN1/Wi-Fi |

| PATTERN ID | INPUT-PERMITTED PATH | OUTPUT-PERMITTED PATH |
|---|---|---|
| PATTERN 1 | LAN1/Wi-Fi | LAN1 |
| PATTERN 2 | LAN2 | LAN2 |
| PATTERN 3 | LAN1/LAN2/Wi-Fi | NONE |

| NETWORK GROUP ID | NETWORK INTERFACE INFORMATION | UNSPECIFIED-CASE INFORMATION |
|---|---|---|
| GROUP 6 | LAN1/Wi-Fi | LAN1 |
| GROUP 7 | LAN2 | LAN2 |

| BOX ID | NETWORK INTERFACE INFORMATION (NETWORK IF VIA WHICH INPUT/OUTPUT IS PERMITTED) |
|---|---|
| Box-A | LAN1 |
| Box-B | Wi-Fi |
| Box-C | LAN2, Wi-Fi |
| Box-D | LAN1, LAN2, Wi-Fi |

FIG. 13

| USER ID | NETWORK AVAILABLE TO USER |
|---|---|
| User1 | LAN1 |
| User2 | LAN2, Wi-Fi |
| User3 | LAN1, LAN2, Wi-Fi |

FIG. 14

| USER ID | BOX SUITABLE AS STORAGE DESTINATION |
|---|---|
| User1 | Box-A, Box-D |
| User2 | Box-B, Box-C, Box-D |
| User3 | Box-A, Box-B, Box-C, Box-D |

FIG. 15

BOX SPECIFICATION

PLEASE SELECT BOX SERVING AS STORAGE DESTINATION.

| BOX ID | BOX NAME |
|---|---|
| ○ Box-A | FOR TEAM X |
| ◉ Box-D | FOR WORK Z |

[ CANCEL ] [ CONFIRM ]

FIG. 16

BOX SPECIFICATION

PLEASE SELECT BOX SERVING AS STORAGE DESTINATION.

| BOX ID | BOX NAME | WHETHER OUTPUT OF DOCUMENT TO NETWORK AVAILABLE TO USER IS PERMITTED |
|---|---|---|
| ◉ Box-A | FOR TEAM X | PERMITTED |
| ○ Box-B | FOR SATO | NOT PERMITTED |
| ○ Box-C | FOR WORK Y | NOT PERMITTED |
| ○ Box-D | FOR WORK Z | PERMITTED |

[ CANCEL ] [ CONFIRM ]

| BOX ID | NETWORK INTERFACE INFORMATION (NETWORK IF VIA WHICH INPUT/OUTPUT IS PERMITTED) |
|---|---|
| Box-A | LAN1 |
| Box-B | Wi-Fi |
| Box-C | LAN2, Wi-Fi |
| Box-D | LAN1, LAN2, Wi-Fi |
| Box-Z (FOR UNREGISTERED USER) | Wi-Fi2 |

| USER GROUP | NETWORK INFORMATION (NETWORK AVAILABLE TO USER) |
|---|---|
| Group1 | LAN1 |
| Group2 | LAN2, Wi-Fi |
| Group3 | LAN1, LAN2, Wi-Fi |

| USER | BELONG TO (GROUP) |
|---|---|
| User1 | Group1 |
| User2 | Group2 |
| User3 | Group3 |
| User4 | Group3 |
| User5 | Group1 |

| USER ID | NETWORK AVAILABLE TO USER | BOX LAST USED |
|---|---|---|
| User1 | LAN1 | Box-A |
| User2 | LAN2, Wi-Fi | Box-C |
| User3 | LAN1, LAN2, Wi-Fi | Box-A |

| NETWORK (NETWORK INTERFACE) | TYPE OF PURPOSE |
|---|---|
| LAN1 | FOR CONFIDENTIAL DOCUMENTS |
| LAN2 | FOR GENERAL DOCUMENTS |
| Wi-Fi | FOR CONFIDENTIAL DOCUMENTS |

INFORMATION PROCESSING APPARATUS CAPABLE OF CONTROLLING A DOCUMENT STORED IN A MEMORY NOT TO LEAK TO A NETWORK NOT PERMITTED TO ACCESS AND NON-TRANSITORY COMPUTER READABLE MEDIUM

CROSS-REFERENCE TO RELATED APPLICATIONS

This is a continuation of U.S. patent application Ser. No. 16/558,170 filed on Sep. 2, 2019, now allowed, which claims priority under 35 USC 119 from Japanese Patent Application No. 2018-168450 filed Sep. 10, 2018, the entire disclosures of which are incorporated herein by reference.

BACKGROUND

(i) Technical Field

The present disclosure relates to an information processing apparatus and a non-transitory computer readable medium.

(ii) Related Art

Among information processing apparatuses, there is a type capable of simultaneously connecting to a plurality of networks via a plurality of network interfaces. This type of information processing apparatus may be connected to both of a first network that handles highly confidential data and a second network that handles not confidential data. For example, in the case where the information processing apparatus is an expensive device such as a digital multifunctional peripheral (MFP), it may be advantageous in terms of cost for the information processing apparatus to be able to be shared by the first network and the second network. In such a case, after data handled on the first network is saved in a storage area in that information processing apparatus, that data may happen to leak from the storage area to the second network.

Japanese Patent No. 5511332 discloses a system in which, on receipt by a print control apparatus of a job via any network, the print control apparatus identifies the network via which the job has been received, adds information on the identified network as an attribute value of the job, and, when saving the job in an image forming apparatus, stores the network information added as the attribute value of the job in a management table and manages the network information along with the job. In response to a request from a terminal apparatus to obtain data saved in a hard disk drive (HDD), reference is made to the management table to add network information to the data. It is determined whether or not a transmission condition is satisfied on the basis of the network information and transmission destination network information. When the transmission condition is satisfied, the data is transmitted.

For example, in the case where an information processing apparatus that is capable of simultaneously connecting to a plurality of networks via a plurality of network interfaces and that may be connected to both of a first network that handles highly confidential data and a second network that handles not confidential data is an expensive device such as a digital MFP, it may be advantageous in terms of cost for the information processing apparatus to be able to be shared by the first network and the second network. In such a case, after data handled on the first network is saved in a storage area in that information processing apparatus, that data may happen to leak from the storage area to the second network. As one method of avoiding such circumstances, for example, it is conceivable to provide a dedicated storage area for saving data from the first network in the information processing apparatus, setting an attribute regarding an output path to the storage area, and controlling an output of data in the storage area in accordance with the attribute. In the above-described example, it is conceivable to set, as the attribute of the storage area, an attribute indicating that a network interface for the first network is permitted as the output path of data in that storage area but a network interface for the second storage area is not permitted. Using this method, even in response to an instruction to output data saved in that storage area via a network interface for the second network, that instruction is not executed under control that refers to that attribute.

The case is conceived in which, in an information processing apparatus (such as an MFP) shared by a plurality of users, a plurality of storage areas for different users or different purposes of use are operated. In this case, a user finds a storage area that suits his/her purpose from a displayed list of these storage areas, and specifies that storage area as a data storage destination. Here, it is assumed that the output attribute of the storage area specified by the user as the storage destination does not permit an output of data in that storage area to a network to which a personal computer (PC) at the user's desk is connected. In this case, if data is saved in that storage area, the user becomes unable to download that data to the PC at the user's desk.

SUMMARY

Aspects of non-limiting embodiments of the present disclosure relate to preventing a user from selecting, as a data storage destination, a storage area from which data is not permitted to be output to a network available to the user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a plurality of network interfaces, a plurality of storage areas for saving data, an obtaining unit, and a presenting unit. The plurality of network interfaces is connected to corresponding networks. For each of the plurality of storage areas, a network interface permitted as an output path of the saved data is defined. The obtaining unit obtains network information indicating a network available to a group to which each user belongs. The presenting unit presents to a user a list of storage areas selectable as a data storage destination. The presenting unit presents a list of storage areas for which a network interface connected to a network available to the group to which the user belongs, which is indicated by the network information, is defined as the output path.

BRIEF DESCRIPTION OF THE DRAWINGS

An exemplary embodiment of the present disclosure will be described in detail based on the following figures, wherein:

FIG. 13 is a diagram illustrating an example of the details of a user management table;

FIG. 14 is a diagram illustrating an example of information on boxes suitable as a document storage destination for each user, which are determined from the box management table and the user management table;

FIG. 15 is a diagram illustrating an example of a box selecting screen;

FIG. 16 is a diagram illustrating another example of the box selecting screen;

DETAILED DESCRIPTION

Example of Apparatus Configuration

Figure 1:
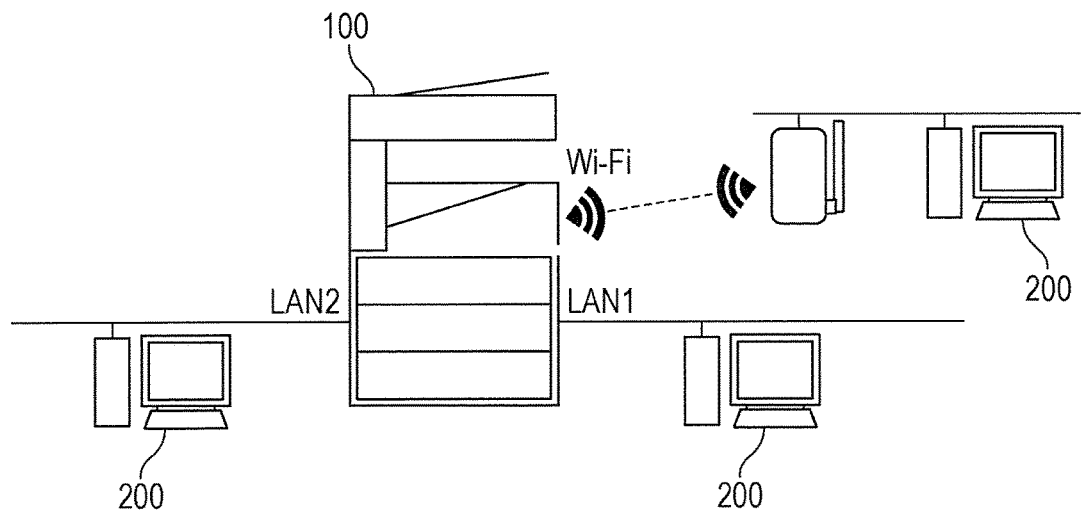
FIG. 1 is a diagram illustrating an example of a network environment to which an MFP to which processing according to an exemplary embodiment of the present disclosure is applied is connected.

FIG. 1 is a diagram illustrating an example of a network environment to which a multi-functional peripheral (MFP) 100 to which processing according to an exemplary embodiment of the present disclosure is applied is connected.

In this example, the MFP 100 includes three network interfaces, and is connected to three different networks, namely, local area network (LAN) 1, LAN 2, and Wi-Fi (registered trademark), via these network interfaces, respectively. A computer 200 such as a personal computer (PC) or a mobile terminal on each network exchanges data with the MFP 100 via a network to which the computer 200 is connected. Note that an MFP is an apparatus that has a combination of functions of a printer, a scanner, a copy machine, a fax machine, and the like.

Figure 2:
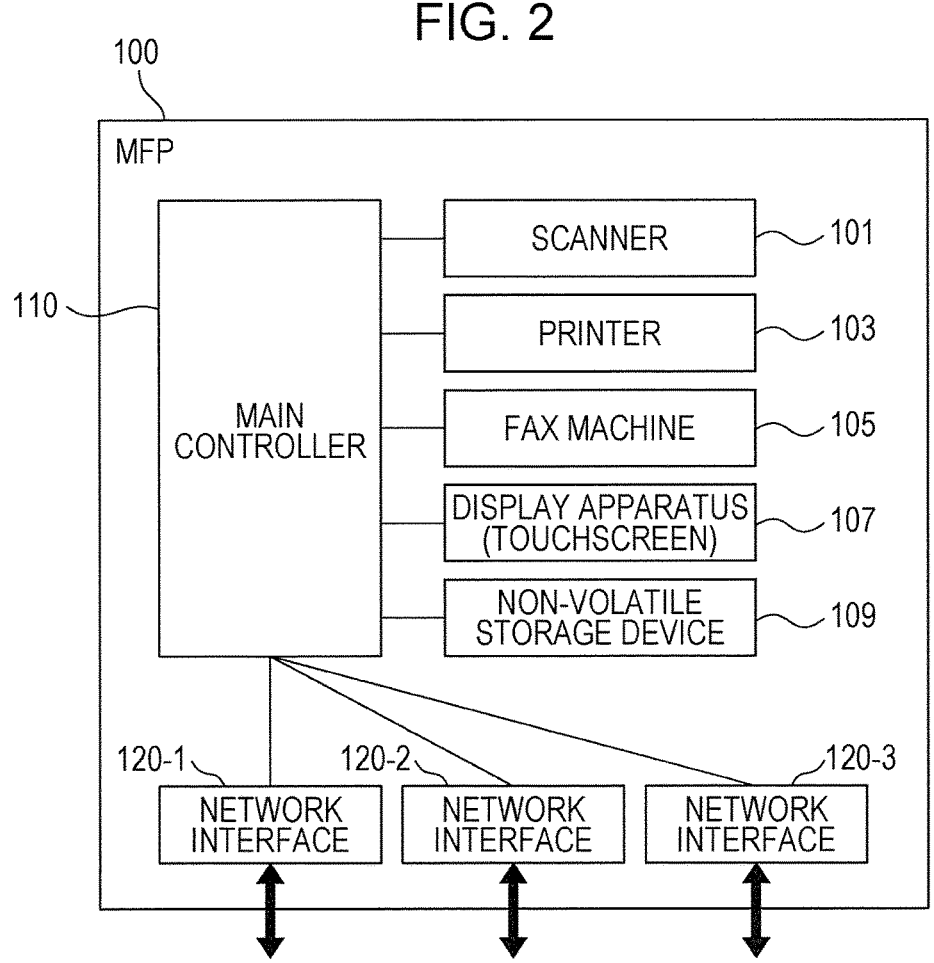
FIG. 2 is a diagram illustrating an example of the internal configuration of the MFP.

FIG. 2 illustrates an example of the internal configuration of the MFP 100. The MFP 100 includes a scanner 101, a printer 103, a fax machine 105, a display apparatus 107, a non-volatile storage device 109, a main controller 110, and network interfaces 120-1, 120-2, and 120-3 (hereinafter may collectively be referred to as "network interfaces 120" when it is not necessary to distinguish between them).

The scanner 101 optically reads an image of a document and generates image data representing the image. The printer 103 prints an image represented by image data on paper. Cooperation of the scanner 101 and the printer 103 realizes copying. The fax machine 105 transmits/receives faxes. The display apparatus 107 is an apparatus that displays a screen for a user interface (UI) of the MFP 100. In this example, the display apparatus 107 is configured as a touchscreen apparatus, and serves also as an input apparatus (however, this is only one example). The non-volatile storage device 109 is a storage device that holds its memory even when the power is turned off, and a hard disk drive (HDD) and flash memory are one example of the non-volatile storage device 109.

The main controller 110 is a device that controls the operation of the MFP 100, and includes a computer that performs data processing and a control program executed by the computer. The main controller 110 receives a user input on a UI screen displayed on the display apparatus 107 and controls the scanner 101, the printer 103, the fax machine 105, and/or the like in accordance with the input, thereby realizing processing designated by the user. In addition, the main controller 110 is connected to networks via the network interfaces 120-1, 120-2, and 120-3, and exchanges instructions and data with computers on the networks. In the example illustrated in FIGS. 1 and 2, it is assumed that the network interface 120-1 is connected to LAN 1; the network interface 120-2 is connected to LAN 2; and the network interface 120-3 is connected to a network via Wi-Fi. For the following description, it is assumed in this example that at least LAN 1 and LAN 2 are different networks. In addition, it is assumed that a network to which the MFP 100 is connected via Wi-Fi is connected to LAN 1.

The MFP 100 has the function of saving image data, print data described in a page description language, and electronic document data such as files generated by various applications (hereinafter may simply be referred to as "documents") in the non-volatile storage device 109.

The MFP 100 may create a plurality of document storage areas. There is no particular restriction on a specific system for realizing a storage area. For example, each storage area may be a folder managed by a file system of the main controller 110, or may be a logic partition or a logic drive set to the non-volatile storage device 109. In addition, a plurality of non-volatile storage devices 109 (physical drives) may be provided in the MFP 100, and each of the physical drives may be defined as a different storage area. In addition, the above-described exemplary types of storage areas may be combined and used. Hereinafter, each storage area will be figuratively referred to as a "box". In order to restrict a user(s) who is/are permitted to access each box, a password may be set to the box, or each user's access right to a box may be defined using an access control list.

The main controller 110 has the function of controlling an input (storage, accumulation) and an output (retrieval) of a document to/from such a box.

A document (image data) generated by scanning performed by the scanner 101, a document received by the fax machine 105, and a document input via a network are saved in a box. In addition, a document saved in a box may be output in forms such as a print output from the printer 103, transmission by the fax machine 105, and transmission via a network.

The MFP 100 illustrated by way of example in FIG. 1 is connected to a plurality of different networks, and these networks may have different security requirements. For example, an example of such a case is that, in an office, a section that handles highly confidential data and a section that handles no confidential data are separated to prevent staff belonging to the latter section from accessing highly confidential data via a network. Even in such a case, it may be difficult to install an expensive MFP 100 for each section, and one MFP 100 may be shared by a plurality of sections. In such a case, the MFP 100 is connected to a network of a section with strict security requirements (referred to as a "first section" for convenience) and to a network of a section with not strict security requirements. To satisfy the security requirements of the former section, it is necessary to prepare a box dedicated for the former section as a box (storage area) in the MFP 100, and to prevent leakage of a document saved in this box to a network of the latter section.

For example, a network of the first section and a network of another section different from the first section may happen to use the same network address as a private Internet Protocol (IP) address. In such a case, it is unable to restrict access to a box in the MFP 100 or to restrict transfer of a document in a box using the IP address. As a countermeasure, for example, in transmission of a document in a box, a user who gives an instruction to transmit the document specifies a network interface 120 via which the document is transmitted, thereby preventing leakage of a document in that box to an unexpected network. However, it is difficult for general users to specify a network interface 120 via which a document is transmitted, and it is highly likely that the user is perplexed or selects a wrong network interface 120.

Therefore, in this system, a mechanism is provided for controlling a document saved in a box not to leak to a network not permitted for security reasons. Hereinafter, this mechanism will be described.

Figures 3, 4:
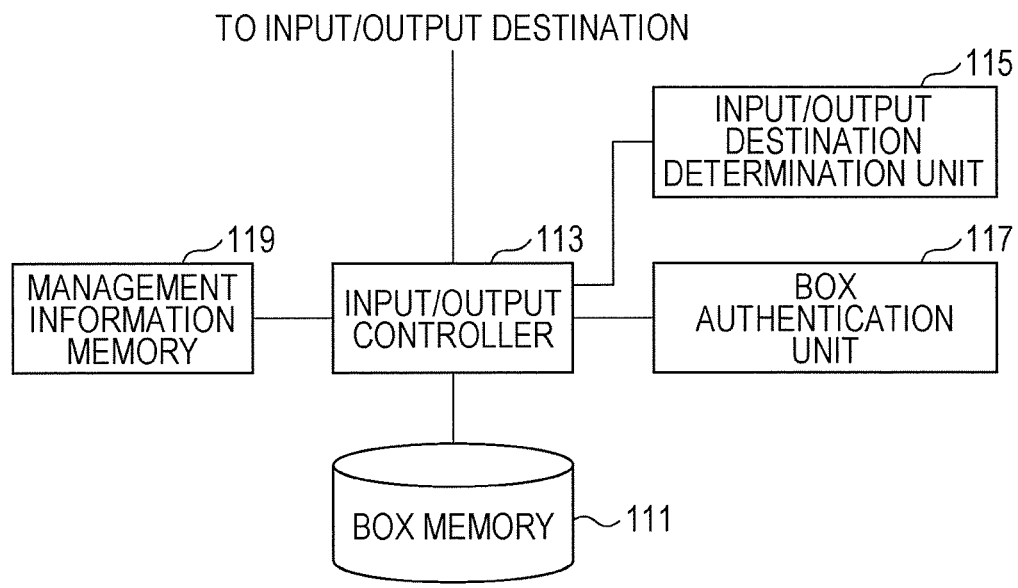
FIG. 3 is a diagram illustrating an example of a mechanism for controlling a document saved in a box not to leak to a network not permitted for security reasons.
FIG. 4 is a diagram illustrating an example of the data structure of input/output path access right information.

FIG. 3 illustrates a group of functions included in the main controller 110 for this mechanism. A box memory 111 stores information on one or more boxes, and information on a document saved in each box. An input/output controller 113 controls an input (storage) or an output (transfer, print, etc.) of a document to/from the box memory 111.

An input/output destination determination unit 115 determines an input source of inputting an operation instruction or a document to a box, and an output destination of a document in a box. The input source of an operation instruction for a box includes a local UI (that is, the display apparatus 107) and an apparatus on a network. An apparatus on a network communicates with the main controller 110 via a corresponding one of the plurality of network interfaces 120. Therefore, the input/output destination determination unit 115 determines from which of the local UI and the plurality of network interfaces 120 the operation instruction that has arrived comes from. Similarly, in response to an input of a document to a box, the input/output destination determination unit 115 determines which of the local scanner 101, the local fax machine 105 (fax reception), and the plurality of network interfaces 120 the input source is. In response to an instruction to output a document in a box, the input/output destination determination unit 115 determines which of the local printer 103, the local fax machine 105 (fax transmission), and the plurality of network interfaces 120 the output destination is.

A box authentication unit 117 authenticates a user to access a box, and authenticates an arriving document to be input (saved) in a box. This authentication is performed using, for example, a password set to a box of interest being operated or to which a document is input. That is, in the case where a user tries to start operating a box, the user is asked to enter a password. In the case where a correct password is entered in response to this, the user is permitted to operate the box. In addition, on receipt of a fax reception addressed to a box, in the case where a password accompanying the received document matches a password set to that box, the document is permitted to be accumulated in that box. In addition, in the case where an access control list is set to a box, a user authentication mechanism (not illustrated) performs user authentication on a user who is trying to operate the MFP 100, and the box authentication unit 117 permits the user identified by the user authentication to operate the box within the scope of authority permitted by that access control list of the box. For example, in the case where a user is permitted to accumulate and print a document in the box but is not permitted to transfer a document in the box via fax or a network, a transfer instruction given from the user is not permitted. In the case where no password is set to a box and no access control is performed using an access control list, a user is permitted to perform all types of operations on that box (note that the user is subjected to later-described operation restrictions in accordance with an input source or an output destination of a document in the box according to the user operation).

A management information memory 119 holds management information used for control performed by the input/output controller 113 for an input/output to/from a box. The held management information includes box input/output information indicating whether an input/output from/to each input source/output destination is permitted according to each box. The box input/output information defines, for example, for each box, an input source permitted to input an operation instruction or a document to that box or an output destination to which a document in that box is permitted to be output. In this case, an input from an input source and an output to an output destination whose permissions are not defined in the box input/output information are not permitted. Alternatively, instead of defining a permitted input source and output destination, the box input/output information may define a not-permitted input source and output destination. In this case, an input from an input source and an output to an output destination whose non-permissions are not defined in the box input/output information are permitted. In addition, the box input/output information is not limited to one that separately defines an input source and an output destination, and may be one that defines, for a certain source (or network interface 120), both an input to and an output from a box are permitted or not permitted.

In addition, from the viewpoint of prevention of unintended leakage of a document in a box, there may be no need to restrict an input (storage) of a document to a box. In such a case, it may only be necessary for the box input/output information to define a permitted output destination of a box (or a not-permitted output destination of a box). As in the above-described example in which the MFP 100 is connected to a plurality of different networks with different security requirements, when a document from a network with strict security requirements is accumulated in a box from which an output to a network with loose security requirements is permitted, there is a risk of leakage to the latter network via that box. In such a case, the box input/output information also defines the input source.

In addition, a local input/output of the MFP 100 (i.e., an input/output not via a network), that is, storage of a document obtained by scanning, fax, and the like in a box, a print output and fax transmission of a document in a box, and so forth are basic functions of the MFP 100, and these functions may be permitted by default. In a few specific examples discussed below, it is assumed that a local input/output to/from a box is permitted. In this case, the box input/output information defines permission or non-permission of an input and an output via each network interface 120.

The input/output controller 113 refers to management information such as the box input/output information held in the management information memory 119, and controls an input and an output of a document to and from each box in the box memory 111.

Next, a process performed by the input/output controller 113 will be described using a specific example.

Figure 5:
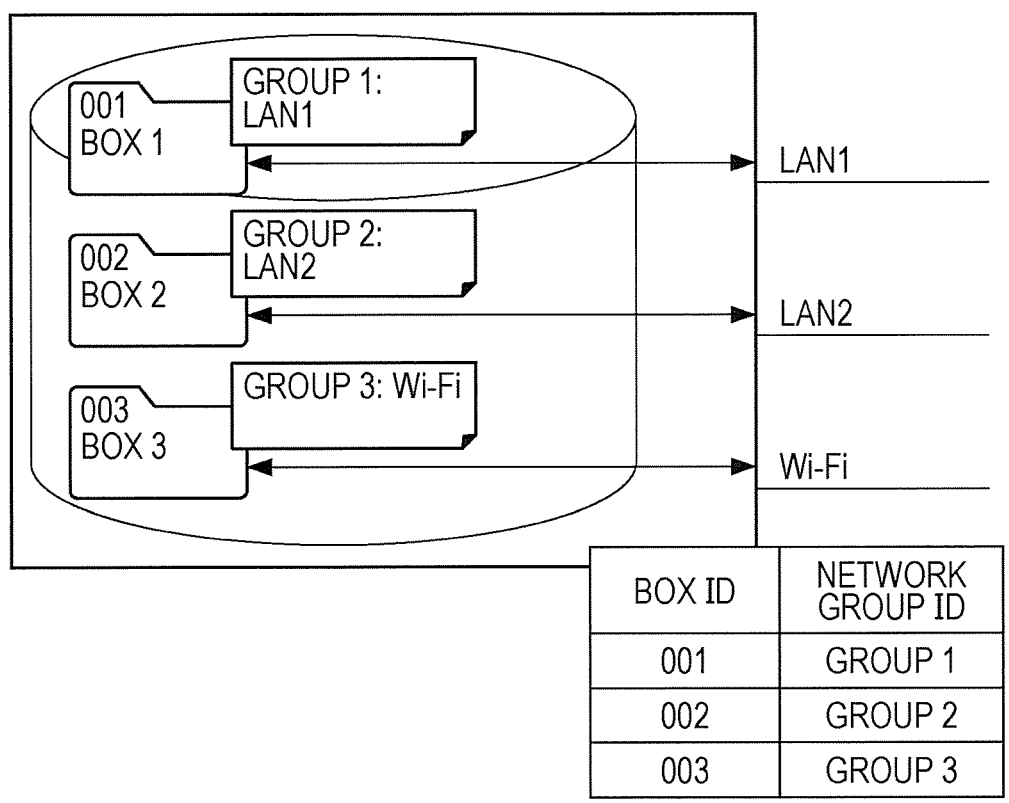
FIG. 5 is a diagram illustrating an example of box input/output information using the input/output path access right information illustrated in FIG. 5.

FIGS. 4 and 5 illustrate input/output path access right information and box input/output information held in the management information memory 119, used in one specific example. This example is an example in the case where the MFP 100 is connected to three networks, namely, LAN 1, LAN 2, and Wi-Fi illustrated in FIG. 1 (via three network interfaces 120 corresponding to LAN 1, LAN 2, and Wi-Fi, respectively).

The input/output path access right information illustrated in FIG. 4 is information that defines a network group. This information includes a network group identification (ID) and network interface information that corresponds to the network group ID. A network group ID is an ID for uniquely defining a network group. Network interface information is a list of IDs of network interfaces constituting a network group with the network group ID. In the example illustrated in FIG. 4, "group 1" is constituted of only the network interface 120 named "LAN 1" (and a network connected thereto); and "group 5" is constituted of two network interfaces 120 named "LAN1" and "Wi-Fi". This group information is used to represent a group permitted to input/output a document to/from a box in the box input/output information illustrated by way of example in FIG. 5.

Although "group 4" has "none" for the value of the network interface information, this is used in the case where no input/output of a document to/from a box via a network interface 120 is permitted at all. In addition, "group 5" is used in the case of, for example, handling a document that complies with the same or similar security requirements on networks connected to "LAN 1" and "Wi-Fi". In the case where this group is associated with a box, a document handled in (that is, saved in or output from) that box is limited to one communicated using LAN 1 and Wi-Fi.

The box input/output information illustrated in FIG. 5 defines, for each box in the box memory 111, the ID of a network group permitted to input/output a document to/from that box. That is, in the example illustrated in FIGS. 4 and 5, a network interface 120 belonging to a network group associated with a box is permitted as both an input path and an output path for that box.

In the example illustrated in FIG. 5, a box named "box 1" (box ID is "001") is associated with group 1. Therefore, for this box 1, an input/output via a network interface 120 with the ID "LAN 1" belonging to group 1 is permitted, but an input/output via other network interfaces 120 is not permitted. That is, the permission mode of an input/output of a document to/from box 1 via a network is as follows:
1) Document storage via LAN 1 is permitted;
2) Document storage via LAN 2 or Wi-Fi is not permitted;
3) Document output (retrieval and transfer) via LAN 1 is permitted; and
4) Document output via LAN 2 or Wi-Fi is not permitted.

Since a local input/output is permitted by default in this example, storage of a document obtained by scanning and fax reception in box 1 and an output of a document in box 1 by printing and fax transmission are permitted.

In this manner, the example illustrated in FIGS. 4 and 5 is one in which, for each box, a network permitted to use that box is defined. In this example, one that is permitted to use a box via a network (that is, one that is permitted to operate that box, permitted to save a document in that box, permitted to retrieve a document in that box, or permitted to be a transfer destination of that document) is limited to an apparatus on a network belonging to a network group associated with that box. Therefore, boxes in the MFP 100 shared by a plurality of networks may be separated according to each network. Also in this example, for a document saved in a box locally (that is, from the scanner 101 or the fax machine 105), box input/output information of that box is applied when retrieving that document from a remote computer or transferring that document to a remote computer. Therefore, leakage of a document saved in a box locally to an unintended network via that box is also prevented.

Figure 6:
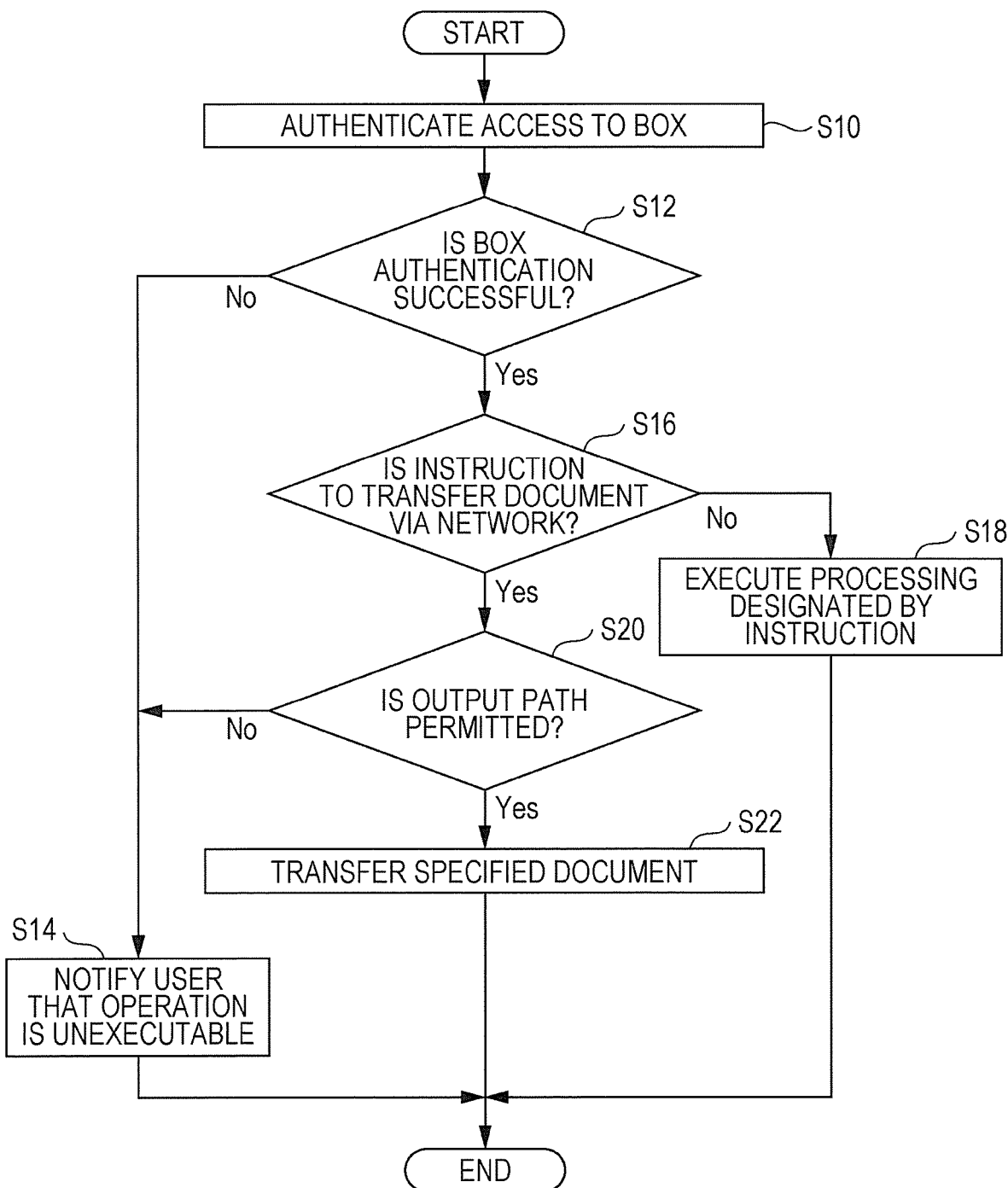
FIG. 6 is a diagram illustrating an example of a process performed by an input/output controller in response to an instruction for a box that is given from a local user interface (UI)
Figure 7:
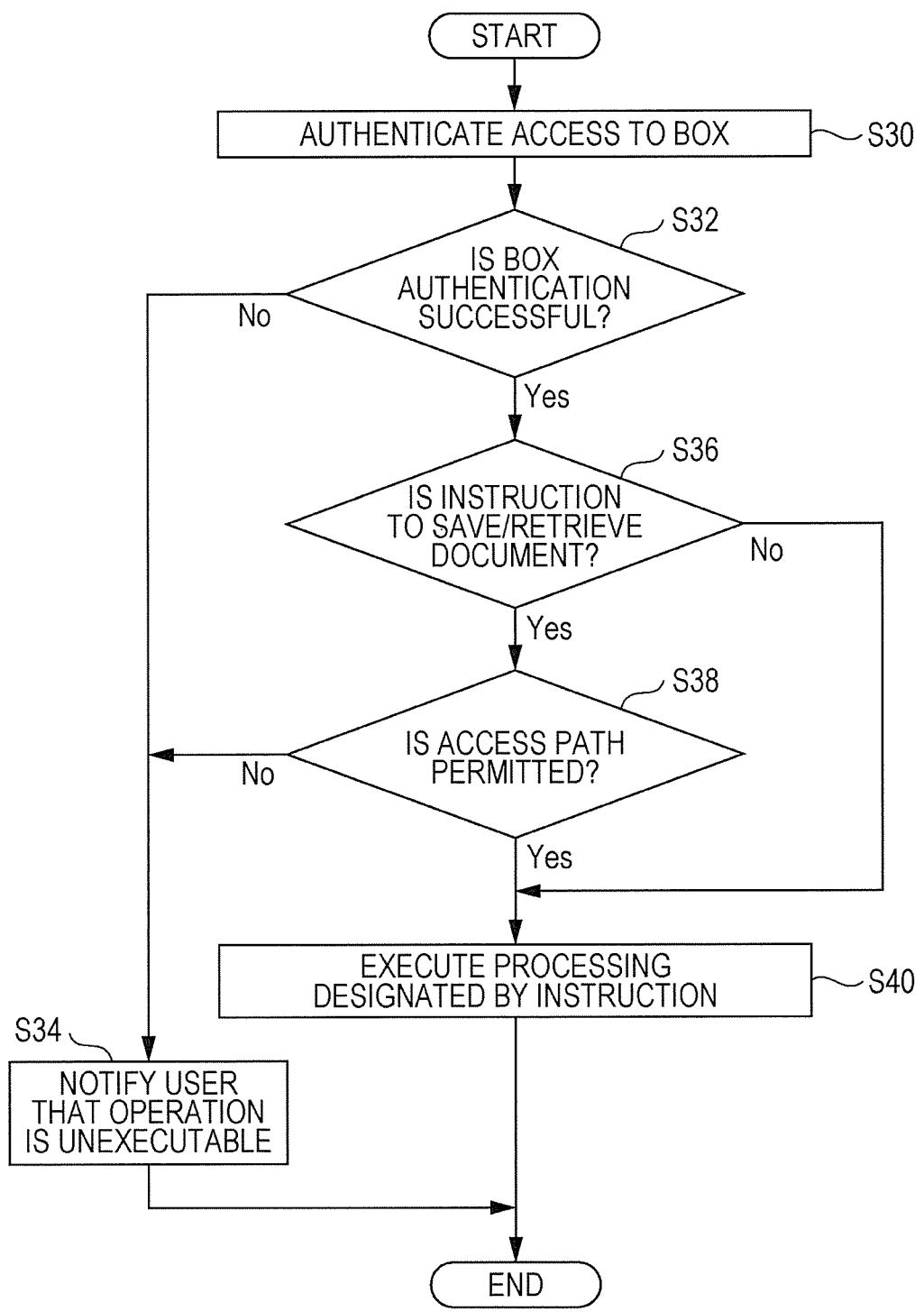
FIG. 7 is a diagram illustrating an example of a process performed by the input/output controller in response to an instruction for a box that is given from a remote computer (network)

Referring next to FIGS. 6 and 7, an example of a procedure executed by the input/output controller 113 will be described.

FIG. 6 illustrates an example of a process performed by the input/output controller 113 in the case where a certain box on a screen of a local UI (display apparatus 107) is specified by a user as an operation target. In this case, the input/output controller 113 causes the box authentication unit 117 to perform access authentication processing for that box (S10). In the case where a password is set to that box, the box authentication unit 117 displays a password entry screen on the UI and asks the user to enter a password. In the case where a password entered by the user in response to this matches the password set to that box, the box authentication unit 117 determines that the authentication is successful. Alternatively, in the case of a system of controlling access to a box using an access control list based on user authentication, the box authentication unit 117 causes a user authentication organization (not illustrated) to perform login authentication on the user, and, in the case where the login authentication is successful, obtains the user ID of the user from the user authentication organization. Whether or not the user ID has any access right to that box (such as the right to save or retrieve a document in that box) is determined from the access control list of that box. In the case where the user has any access right to that box, the box authentication unit 117 determines that the authentication in step S10 is successful; and, in the case where the user does not have any access right at all, the box authentication unit 117 determines that the authentication is unsuccessful. The input/output controller 113 determines whether or not the authentication performed by the box authentication unit 117 is successful (S12).

In the case where the authentication performed by the box authentication unit 117 is unsuccessful, the input/output controller 113 displays an error screen indicating that an operation on the specified box is unexecutable on the local UI (S14), and ends the process.

In the case where the authentication performed by the box authentication unit 117 is successful, the input/output controller 113 determines whether or not an instruction given from the user regarding that box is an instruction to perform an operation to transfer a document in that box via a network (S16). For example, in the case where a transfer operation using a network transfer protocol such as the File Transfer Protocol (FTP) or the Simple Mail Transfer Protocol (SMTP) is given, the result of the determination in step S16 is yes (affirmative). In contrast, in the case where an operation other than transfer via a network, such as a printout or fax transmission of a document in the box, or storage of a scanned document in the box, is given, the result of the determination in step S16 is no (negative).

In the case where the result of the determination in step S16 is no (negative), the input/output controller 113 executes processing designated by the user (S18). For example, in the case where the user has given an instruction to perform an operation to save a scanned document in the box, the input/output controller 113 receives a document generated by the scanner 101 and saves the document in the box in the box memory 111.

In the case where the result of the determination in step S16 is yes (affirmative), the input/output controller 113 causes the input/output destination determination unit 115 to determine which network interface 120 an output path to a transfer destination of transfer (transmission) designated by the user is. The input/output destination determination unit 115 may perform this determination by, for example, determining which network, ahead of which network interface 120, has the address (such as the IP address) of the transfer destination. The input/output controller 113 refers to the management information memory 119 and determines whether or not a network interface 120 determined by the input/output destination determination unit 115 is permitted, in the box input/output information, as an output path of a document in that box (S20). In the case of the example illustrated in FIGS. 4 and 5, the result of the determination in step S20 is yes (affirmative) in the case where the network interface 120 is included in a network group associated with that box; and the result of the determination in step S20 is no (negative) in the case where the network 120 is not included in a network group associated with that box.

In the case where the result of the determination in step S20 is no (negative), the input/output controller 113 displays an error screen indicating that the designated operation is unexecutable on the local UI (S14), and ends the process.

In the case where the result of the determination in step S20 is yes (affirmative), the input/output controller 113 transfers a document specified as a target to be transferred to the specified transfer destination (S22).

FIG. 7 illustrates an example of a process performed by the input/output controller 113 in the case where a user has given an instruction to perform an operation on a box from a remote computer connected via a network to the MFP 100. An operation on a box from a remote computer includes, for example, storage of a document in the box (that is, uploading of a document from the computer to the box), retrieval of a document in the box (downloading of a document in the box to the computer), and displaying of a screen for operating the box.

In this case, the input/output controller 113 causes the box authentication unit 117 to perform access authentication processing for that box (S30). In the case where an instruction given from the remote computer is an instruction to save a document in that box, the box authentication unit 117 checks whether or not a password set to that box is included in that document storage instruction, and determines that the authentication is successful in the case where the password is included, and determines that the authentication is unsuccessful in the case where the password is not included. On receipt of a request to access a box from a remote user, the box authentication unit 117 asks the user to enter a password of the box, and, in the case where the correct password is entered in response to this, determines that the authentication is successful. Alternatively, in the case of a system of controlling access to a box using an access control list, like the case illustrated in FIG. 6, in the case where the user authentication is successful, the box authentication unit 117 obtains the user ID of a user whose login has been successful from the user authentication organization, and determines whether or not that user ID has any access right to that box from the access control list of that box. In the case where the user has any access right to that box, the box authentication unit 117 determines that the authentication in step S30 is successful.

In the case where the authentication performed by the box authentication unit 117 is unsuccessful, the input/output controller 113 displays error information indicating that an operation on the specified box is unexecutable on a remote apparatus that has given the instruction (S34), and ends the process.

In the case where the authentication performed by the box authentication unit 117 is successful, the input/output controller 113 determines whether or not an instruction given from the remote user regarding that box is an instruction to save (upload) a document in that box or to retrieve (download) a document in that box (S36).

In the case where the result of the determination in step S36 is no (negative), the input/output controller 113 executes processing designated by the user (S40). For example, in the case where the user instruction is to display an operation screen in that box, information on that operation screen is transmitted via a network to that user's computer.

In the case where the result of the determination in step S36 is yes (affirmative), the input/output controller 113 causes the input/output destination determination unit 115 to determine which network interface 120 a path that has received the remote user instruction is. The input/output controller 113 refers to the management information memory 119 and determines whether or not a network interface 120 determined by the input/output destination determination unit 115 is permitted, in the box input/output information, as an input or output path of a document in that box (S38). In this determination, in the case of a document storage instruction, whether or not the determined network interface 120 is permitted as an input path is determined; and, in the case of a document retrieval instruction, whether or not that network interface 120 is permitted as an output path is determined. In the case of the example illustrated in FIGS. 4 and 5, because no distinction is made between an input and an output, the result of the determination in step S38 is yes (affirmative) in the case where the network interface 120 is included in a network group associated with that box; and the result of the determination in step S40 is no (negative) in the case where the network 120 is not included in a network group associated with that box.

In the case where the result of the determination in step S38 is no (negative), the input/output controller 113 returns error information indicating that the designated operation is unexecutable to the remote user's computer (S34), and ends the process. In the case where the result of the determination in step S38 is yes (affirmative), the input/output controller 113 executes the operation designated by the user, such as storage of a document in the box or retrieval of a document in the box (S40).

In the procedure illustrated in FIG. 7, on receipt of an instruction from a remote computer to perform an operation on a box, it is determined whether or not the operation according to the instruction is permitted from a combination of the instruction and a network to which the computer is connected. However, this order of the instruction and the determination is only one example. Alternatively, when a user accesses a box in the MFP 100 from a remote computer, the input/output controller 113 may determine whether or not, for that computer, an input or an output of a document to or from that box is permitted, and may display a not-permitted operation in an unselectable state on the operation screen (that is, a state in which that operation is unselectable on the screen).

According to the process illustrated in FIG. 7, in the case where a user accesses a box from a remote computer, even in the case where the user has the right to access that box, if that computer is on a network not permitted to be used for inputting or outputting a document to or from that box, storage or retrieval of a document in that box is unexecutable. Note that, even in this case, operations on that box within a certain range, other than document storage or retrieval, may be permitted. In addition, in the case where a computer accessing a box is located on a network not permitted to be used for inputting or outputting a document to or from that box, even displaying of a screen for operating that box may not be permitted.

Figures 8, 9, 10:
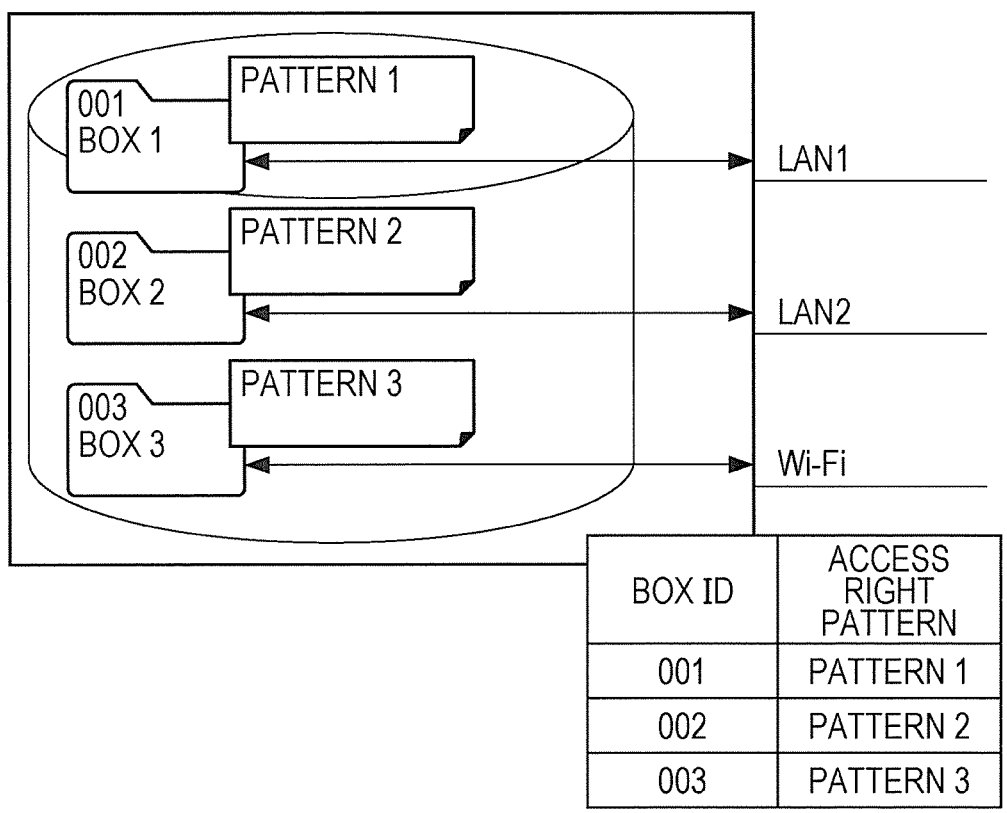
FIG. 8 is a diagram illustrating another example of the data structure of the input/output path access right information.
FIG. 9 is a diagram illustrating an example of box input/output information using the input/output path access right information illustrated in FIG. 8.
FIG. 10 is a diagram illustrating an example of the data structure of input/output path access right information including the item "unspecified-case information"

Referring next to FIGS. 8 and 9, another example of the box input/output information held in the management information memory 119 will be described.

FIG. 8 is a diagram illustrating an example of the input/output path access right information in this example. This input/output path access right information is, unlike the example illustrated in FIG. 4, separately defined for an input path and an output path. That is, the input/output path access right information illustrated in FIG. 8 defines one or more patterns of a combination of an input-permitted path and an output-permitted path. An input-permitted path is one or more network interfaces 120 permitted as an input path(s) of a document to that box, and an output-permitted path is one or more network interfaces 120 permitted as an output path(s) of a document in that box. For example, pattern 3 permits three network interfaces 120, namely, LAN 1, LAN 2, and Wi-Fi, as input paths to that box, but does not permit any network interface 120 as an output path ("none"). This means that any document in that box is not permitted to be output via a network at all.

The box input/output information illustrated in FIG. 9 defines, for each box in the box memory 111, the pattern ID of input/output access right information set to that box.

In the example illustrated in FIG. 9, box 1 (box ID is "001") is associated with pattern 1. Therefore, for this box 1, document input (storage) via two network interfaces 120, LAN 1 and Wi-Fi, and document output via LAN 1 are permitted. Therefore, in the case of the MFP 100 connected to LAN 1, LAN 2, and Wi-Fi illustrated by way of example in FIG. 1, the permission mode of an input/output of a document via a network for box 1 is as follows:

1) Document storage via LAN 1 or Wi-Fi is permitted;
2) Document storage via LAN 2 is not permitted;
3) Document output (retrieval and transfer) via LAN 1 is permitted; and
4) Document output via LAN 2 or Wi-Fi is not permitted.

Pattern 1 associated with this box 1 is useful in the case where, although networks to which LAN 1 and Wi-Fi are connected handle documents that require similar security, LAN 1 has higher security than Wi-Fi. That is, because an input of a document to box 1 is one time only for that document, the risk of leakage is low when an input is permitted from both LAN 1 and Wi-Fi; however, because document output is performed multiple times for one document, the risk of leakage is reduced by permitting only LAN 1, which is considered to have a lower risk of leakage than Wi-Fi.

In addition, in the case of box 3 to which pattern 3 is set, the mode of permission of an input/output of a document via a network is as follows:

1) Document storage via LAN 1, LAN 2, or Wi-Fi is permitted; and
2) Document output (retrieval and transfer) via LAN 1, LAN 2, or Wi-Fi is not permitted.

Although all of the patterns illustrated by way of example in FIG. 8 have only one network interface 120 permitted as an output-permitted path, a plurality of network interfaces 120 may be set as output-permitted paths.

A control procedure performed by the input/output controller 113 on the basis of the input/output path access right information and the box input/output information illustrated by way of example in FIGS. 8 and 9 may be the same as or similar to the procedures illustrated in FIGS. 6 and 7.

Next, an example of controlling an output of a document in a box using unspecified-case information will be described.

There is a case in which a plurality of network interfaces 120 permitted as document output paths are set for a box. For example, in the case where there is a box to which group 5 illustrated in FIG. 4, this box corresponds to this case. In the case of transferring a document in such a box via a network, there is a case in which the document is transferrable to the transfer destination using any of the plurality of network interfaces 120 set as output paths. In this case, unless a user who gives a transfer instruction explicitly specifies a network interface 120 that serves as a path for transferring the document, the document is transferred via a network interface 120 selected by an operating system from among the plurality of network interfaces 120. However, as in the above-discussed relationship between LAN 1 and Wi-Fi, although a plurality of network interfaces 120 set to a box as paths permitted to output a document are connected to the same network, one of these network interfaces 120 may be superior to another in terms of the risk of leakage of transferred data. In this case, a network interface 120 selected by the operating system from among the plurality of network interfaces 120 is not always better in terms of the risk of leakage.

Although the case in which the user does not specify a network interface 120 that serves as a path for transferring a document has been discussed above by way of example, for example, in the case of applying a processing flow including document transfer (one example is a specification disclosed in Japanese Unexamined Patent Application Publication No. 2013-138284) to a box, the name, address, and so forth of an apparatus at the transfer destination are described in the processing flow, but a network interface via which the document is transferred is not defined in many cases. Therefore, the same or similar situation may occur in the case of using the processing flow on a box.

To prevent such a situation, unspecified-case information may be set to a box in this example. In the case of transferring a document in a box via a network, if a user, a processing flow, or the like does not explicitly specify a network interface 120 serving as the output path, unspecified-case information defines a network interface 120 used as the output path.

FIG. 10 illustrates an example in which the item "unspecified-case information" is added to the input/output path access right information illustrated in FIG. 4. The network interface 120 indicated in the item "unspecified-case information" is selected from among a plurality of network interfaces 120 indicated in the item "network interface information". In the illustrated example, document storage and retrieval/transfer via LAN 1 and Wi-Fi is permitted for a box to which group 6 is set. In the case where a network interface 120 via which a document in the box is transferred is not specified by the user or the like in a document transfer instruction, the input/output controller 113 selects LAN 1 defined in the unspecified-case information as a path for the transfer according to the instruction.

With such control, in the case where a network interface 120 that serves as a path for transferring a document in a box is not explicitly specified, a network interface 120 that is inferior in terms of the risk of leakage is prevented from being selected by the operating system as the path.

In the above-described example, in the case where a network interface 120 via which a document in a box is transferred and which is explicitly specified by the user is not permitted as an output path in box input/output information of that box, the input/output controller 113 does not perform the transfer, and responds to the user that the transfer is unexecutable.

Although FIG. 10 illustrates the input/output path access right information illustrated in FIG. 4 with the addition of the item "unspecified-case information", the item "unspecified-case information" may be added to the input/output path access right information illustrated in FIG. 8 for the operation.

Exemplary Embodiment of UI Control

An exemplary embodiment of UI control for a box will be described. Reference is made to the exemplary network environment in which the MFP 100 is installed, which is illustrated in FIG. 1. In this exemplary embodiment, the configuration of the MFP 100 and processing of the box input/output control may be the same as or similar to the above-described examples discussed with reference to FIGS. 2 to 10.

Figures 11, 12:
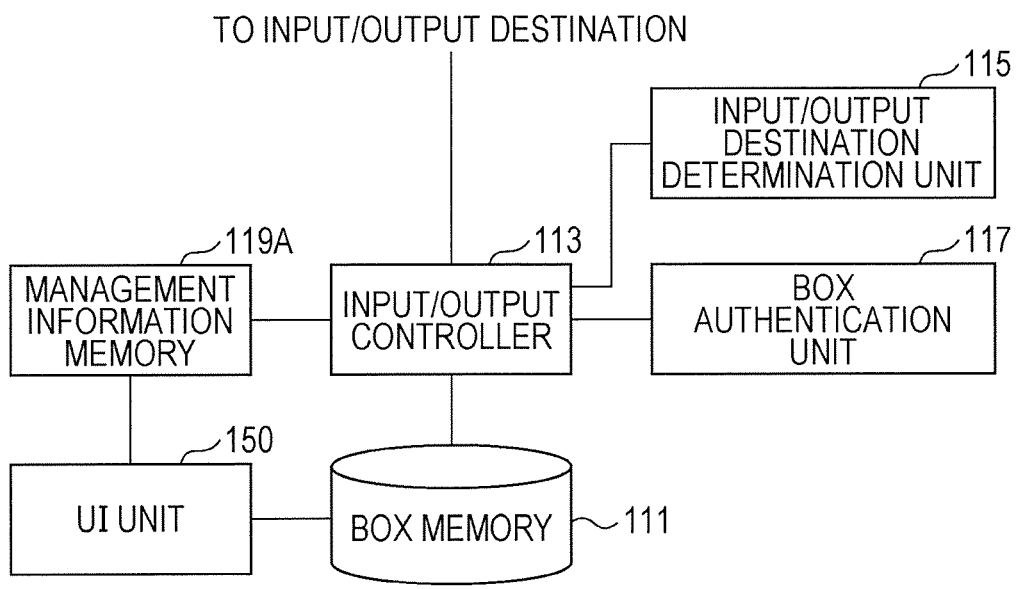
FIG. 11 is a diagram illustrating an example of the apparatus configuration according to the exemplary embodiment for presenting a screen for selecting a storage destination box.
FIG. 12 is a diagram illustrating an example of the details of a box management table.

FIG. 11 illustrates the functional configuration of major units of the main controller 110 of the MFP 100 according to this exemplary embodiment. FIG. 11 explicitly illustrates a UI unit 150 in the configuration illustrated in FIG. 3. The UI unit 150 is a processor that provides a UI of the MFP 100 to the user. The UI unit 150 prepares various UI screens for operating various functions of the MFP 100. In this exemplary embodiment, control of a UI screen provided to the user who saves (stores) a document in a box will be particularly described.

A user who uses the MFP 100 is often restricted to one or a few networks available to the user in accordance with, for example, the user's job or the place of the user's desk. For example, a network to which a desktop PC at the user's desk is physically connected is determined. In addition, in the case where a terminal used by the user is a mobile terminal such as a notebook PC, a network that the user is permitted to log in and a network that the user is not permitted to log in may be determined in accordance with the user's job or the like.

In contrast, as has been described so far, box input/output information is associated with each box in the box memory 111. A document saved in a box may be output to a network corresponding to an output-permitted path defined in that box's box input/output information.

Therefore, if a user carelessly selects a box for saving a document, the user may select a box from which the document is not permitted to be output via a network available to the user. In the case where the user stores a document in such a box, the user becomes unable to obtain that document via a network that the user uses.

To this end, this exemplary embodiment provides a UI for preventing a user from erroneously storing a document in a box from which the document is not permitted to be output via a network available to the user. The UI unit 150 refers to information stored in a management information memory 119A and provides such a UI. Information stored in the management information memory 119A for this purpose is illustrated by way of example in FIGS. 12 and 13.

FIG. 12 illustrates a box management table indicating box input/output information. In the box management table in this example, a network interface (IF) permitted as a path for inputting/outputting a document to/from a box is registered in association with the ID (identification information) of that box. Note that the box input/output information may separately define an input-permitted path and an output-permitted path for a box, as illustrated in FIGS. 8 and 9. FIG. 13 illustrates a user management table that holds information on a network available to a user. In this table, identification information of a network available to a user is registered in association with the ID of that user. For example, the user "User 2" is permitted to connect to LAN 2 and Wi-Fi in the network environment illustrated in FIG. 1. Note that the same name is used for the identification name of a network interface included in the MFP 100 and the identification name of a network to which that network interface is connected.

A user is permitted to retrieve a document in a box to a terminal on a network available to the user in the case where that network (and a network interface connected to that network) is permitted as an output-permitted path of that box. To this end, the UI unit 150 provides, as a UI screen for selecting a box that serves as a document storage destination, a screen on which it is easy to identify a box from which a document is permitted to be retrieved to a terminal on a network available to the user.

To generate such a UI screen, the UI unit 150 refers to the box management table (see FIG. 12) and the user management table (see FIG. 13) stored in the management information memory 119A, and identifies a box from which a document is permitted to be output to a network available to that user as a box suitable as a document storage destination for that user. For example, in the case of a combination of the box input/output information illustrated in FIG. 12 and the network information illustrated in FIG. 13, boxes suitable as a document storage destination for each user are such as those illustrated in FIG. 14. For example, boxes suitable as a document storage destination for the user "User 2" are "Box-B", "Box-C", and "Box-D", which include at least one of "LAN 1" and "Wi-Fi", which are networks available to the user, as an output-permitted path.

In the case where an instruction to save a document in a box is input to the MFP 100 via a network, that document is input from that network to a box in the MFP 100 and saved in that box. Therefore, a box permitted as a storage destination in response to that storage instruction is restricted to one that has that network (and a network interface connected to that network) as an input-permitted path. Therefore, in response to a storage instruction from a network, the condition that the requirement "box suitable as a document storage destination" includes that network as an input-permitted path is added. That is, a "box suitable as a document storage destination" in response to a storage instruction from a network is a box from which a document is permitted to be output via a network available to that user, and is a box that includes, as an input-permitted path, a network interface that has served as an input path of that storage instruction.

The UI unit 150 provides, as a UI screen for selecting a box that serves as a document storage destination, a screen that distinguishably displays a box suitable as a document storage destination for that user (that is, a box from which a document is permitted to be output via a network available to that user) from other boxes.

In one example, as illustrated in FIG. 15, the UI unit 150 provides to a user a box specification screen 300 that displays only boxes suitable as a document storage destination for that user as a list of storage destination options. The example illustrated in FIG. 15 illustrates, for the MFP 100 to which the box management table illustrated in FIG. 12 and the user management table illustrated in FIG. 13 are applied, an example of the box specification screen 300 provided in the case where the user "User 1" gives an instruction to save a scanned document in a box. On this box specification screen 300, the box ID and the box name of boxes suitable as a document storage destination for "User 1" (see FIG. 14) are displayed in the form of a list. In this example, radio buttons 302 indicating selection are provided in the box ID field. The box name of a box is a name given to that box by a user who has the right to name that box, such as the owner of that box (for example, a person who has performed an operation to open that box). Referring to the box names, the user selects a box that serves as the current document storage destination. The user sets a box that serves as a storage destination to the selected state by, for example, touching the radio button 302 of that box, and presses a "confirm" button 304 to confirm the selection of a box that serves as a storage destination.

In addition, a box specification screen 300A in another example illustrated in FIG. 16 includes not only boxes suitable as a document storage destination for the user, but also includes other boxes as a list of options. In this list, boxes suitable as a document storage destination for the user and boxes that are not suitable are distinguishably displayed. The example illustrated in FIG. 16 is presented in the case where the user "User 1" gives an instruction to save a document, like the case illustrated in FIG. 15. In the list of options, boxes (Box-A and Box-D) suitable as a document storage destination are displayed with higher luminance than other boxes (Box-B and Box-C) so as to stand out. The box specification screen 300A in the illustrated example has a field for indicating whether or not each box is permitted to output a document to a terminal on a network available to that user such that options with high luminance and options with low luminance are distinguishable. For Box-A and Box-D, the value in this output-permitted/not permitted field is set to "permitted"; and for the remaining two boxes, the value is set to "not permitted". Looking at the displayed box specification screen 300A, the user selects either of Box-A and Box-D when, for example, the user has a plan to retrieve the saved document to a terminal on a network. The display distinction between boxes suitable as a document storage destination and other boxes is not restricted to luminance or displaying permitted/not permitted, as discussed in the above example. Alternatively, for example, the color or font size may be made different.

Note that box options displayed in the form of a list on the box specification screen 300A may be, in one example, all the boxes provided in the MFP 100. In another example, in the case where each user's right to access each box is set, a group of boxes that a user who has given a document storage instruction has the right to access is displayed as options.

Although options for the storage destination box displayed on the box specification screens 300 and 300A are in the form of a list in the example illustrated in FIGS. 15 and 16, the form of displaying options is not restricted to a list form. Alternatively, for example, a screen in the form of displaying the icons of boxes that are options in the form of a matrix may be used.

Figure 17:
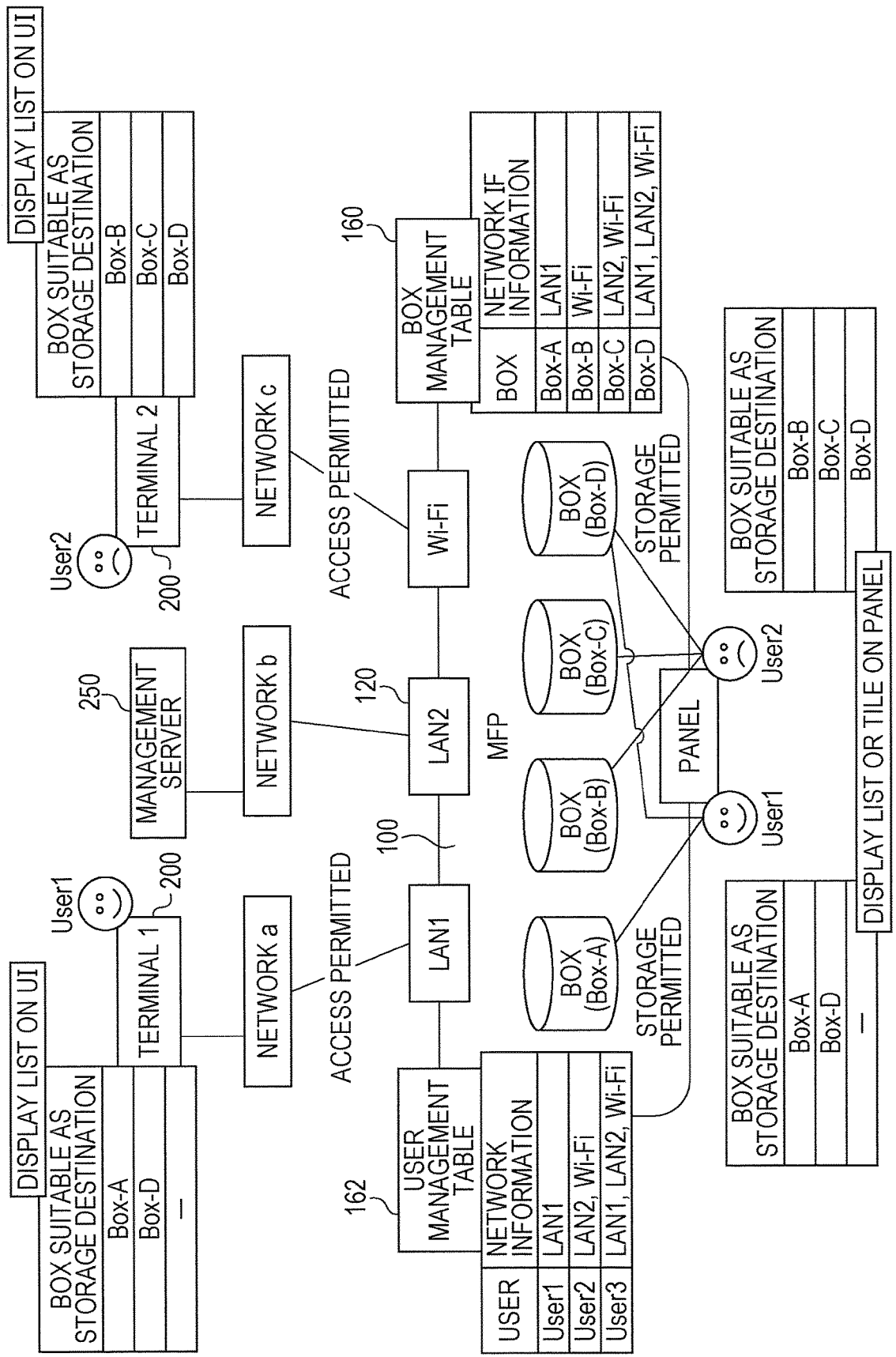
FIG. 17 is a diagram illustrating an example of document storage destination options presented to each user.

FIG. 17 summarizes an example of displaying, on the MFP 100, options for a box that serves as a document storage destination on the basis of a box management table 160 illustrated by way of example in FIG. 12 and a user management table 162 illustrated by way of example in FIG. 13. The example illustrated in FIG. 17 is an example in the case where only boxes suitable as a document storage destination for each user are displayed as options in the form of a list. In the case where the user "User 1" gives, for example, an instruction to a panel of an operation unit (the display apparatus 107 which is a touchscreen, for example) of the MFP 100 to perform the type of scanning that saves the result of scanning in a box, Box-A and Box-D are displayed as options in the form of a list on the touchscreen (display apparatus 107) of a console of the MFP 100. In addition, in the case where the user "User 1" accesses the MFP 100 from a terminal 200 on a network connected to the network interface LAN 1 and gives an instruction to save a document, Box-A and Box-D are displayed as storage destination options on the terminal 200. These options are boxes that have the network interface LAN 1 via which the storage instruction has passed through as an input-permitted path, and, at the same time, are boxes that have the network (LAN 1) available to "User 1" who has given the instruction as an output-permitted path. In addition, in the case where the user "User 2" gives an instruction from the operation panel of the MFP 100 or from the terminal 200 on a network c to use a function involving storage of a document in a box, Box-B, Box-C, and Box-D are presented as storage destination options.

Although the example in which the box management table 160 and the user management table 162 are held in the MFP 100 (management information memory 119) has been described in the above-described exemplary embodiment, this is only one example. These tables may be held in a management server 250 on a network accessible from the MFP 100. Although the management server 250 is provided on a network b connected to the network interface LAN 2 in FIG. 17, this is only one example.

First Modification

Next, a first modification will be described.

In order for a user to use a mechanism of the above-described exemplary embodiment, the user needs to be registered in the MFP 100 (or a system that manages users for using the MFP 100). Therefore, in order for a person who does not belong to an organization in which the MFP 100 is installed (such as a visitor to that organization) to use that mechanism, that person needs to be registered as a user, which is bothersome.

To this end, the first modification proposes a system that copes with a user who is not registered (unregistered user). In this system, a box for an unregistered user is provided in the box memory 111. In the case where a user who is operating the MFP 100 is an unregistered user (such as in the case where that user is using the MFP 100 without logging in), the UI unit 150 presents, on a UI screen for document storage, that box for an unregistered user as a storage destination option. On this UI screen, a group of boxes for registered users is not displayed as options. An unregistered user is allowed to select only that box for an unregistered user.

Box input/output information may be set to this box for an unregistered user, like general boxes, and an input/output between the box and a network may be controlled in accordance with the box input/output information. In this case, the input-permitted path and the output-permitted path of that box are determined by taking network security into consideration. For example, the input-permitted path and the output-permitted path of that box at least do not include a network that handles confidential documents (such as LAN 1 and Wi-Fi in FIG. 1). In addition, in the case of the policy that a network for business is inaccessible to outsiders, the MFP 100 is connected to an external network available to outsiders, and a network interface of that network is set as the input-permitted path and the output-permitted path of that box. For example, in a box management table illustrated by way of example in FIG. 18, the box "Box-Z" prepared for an unregistered user is associated with a network interface for such an external network (Wi-Fi2).

For example, in the case where an unregistered user gives an instruction from the local UI (display apparatus 107 or the like) of the MFP 100 to perform scanning which involves box usage, the box for an unregistered user is presented to that user as a storage destination. A document which is the result of scanning executed in response to this instruction is saved in that box. The input/output controller 113 permits retrieval of a document in that box from a network of an output-permitted path associated with that box, but does not accept retrieval of a document in that box from other networks.

Such a box for an unregistered user may be fixedly provided or may be established on demand.

Figures 18, 19:
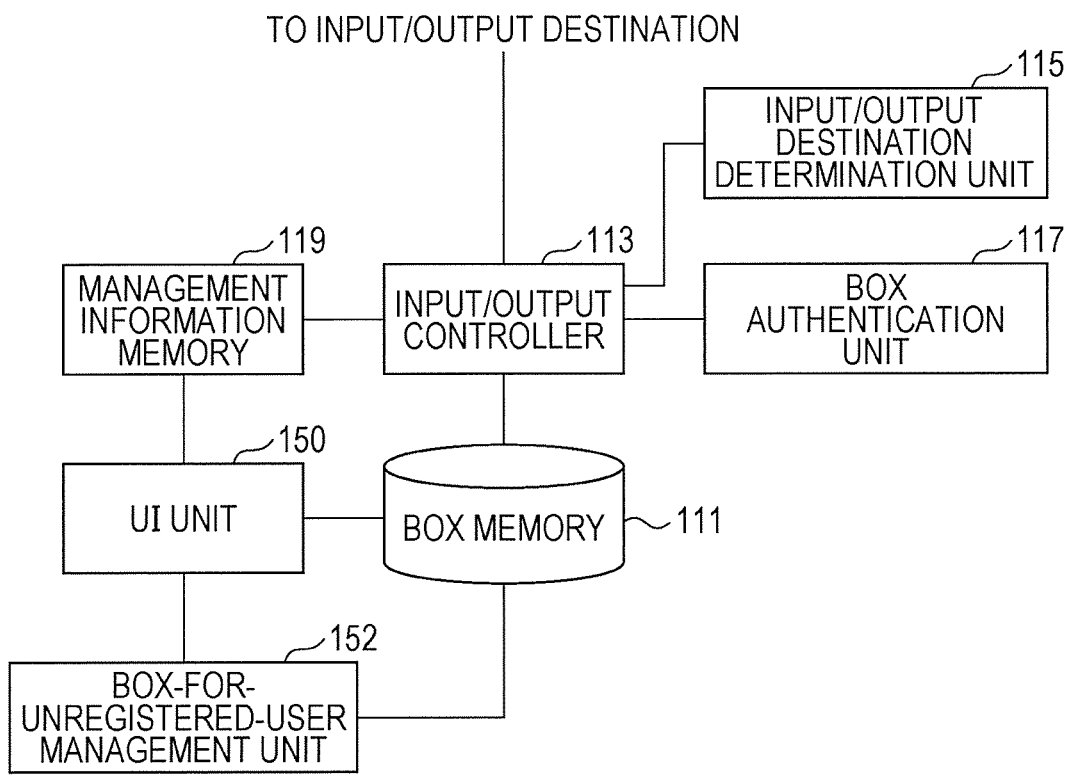
FIG. 18 is a diagram illustrating an example of a box management table including information on a box for an unregistered user according to a first modification.
FIG. 19 is a diagram illustrating an example of the functional configuration of a main controller according to the first modification.

In the latter case (on demand), for example, as illustrated in FIG. 19, in the case where the UI unit 150 of the main controller 110 receives an instruction from a user who is not logged in (that is, an unregistered user) to execute a function that uses a box, such as the type of scanning that saves the result of scanning in a box, the UI unit 150 sends an instruction to a box-for-unregistered-user management unit 152 to generate a box for an unregistered user. On receipt of the instruction, the box-for-unregistered-user management unit 152 newly establishes a box for an unregistered user in the box memory 111. The UI unit 150 presents to that user a UI screen indicating that box for an unregistered user as a box selectable as a usage destination, and, on receipt of an instruction from that user to use that box, executes the designated function. In the case where there is already a box for an unregistered user at the time of receipt of an instruction to execute a function that uses a box, no new box may be generated, and the existing box may be presented to the user as a storage destination.

In addition, the box-for-unregistered-user management unit 152 may delete the established box for an unregistered user at a time point at which it is determined that the use of that box has ended. Here, whether the use of the box for an unregistered user has ended may be determined as follows. For example, it may be determined that the use of the box established in response to an instruction from an unregistered user has ended when, after a document such as the result of scanning is saved in that box, the document is retrieved from the box and the box becomes empty. Alternatively, when there is no user access to an established box for an unregistered user (for example, there is no instruction from a local or remote UI to save a document or to transfer or retrieve a saved document) for a certain period of time or longer (so-called time out), it may be determined that the use of that box has ended.

Second Modification

In the above-described exemplary embodiment and first modification, networks available to users in units of individuals are set (see the user management table illustrated in FIG. 13). However, this system uselessly consumes resources for control and involves a great burden for maintaining the user management table. To this end, networks available to users in units of groups may be set in a second modification.

In the second modification, a group management table (see FIG. 20) and a user information table (see FIG. 21) are held in the management information memory 119. In the group management table, for each user group, identification information of a network available to users who belong to that group is registered in association with the ID of that group. In the user information table, the ID of a user group to which each user belongs is registered in association with the ID of that user. These tables are maintained by the administrator of the MFP 100 or the like.

Figures 20, 21, 22:
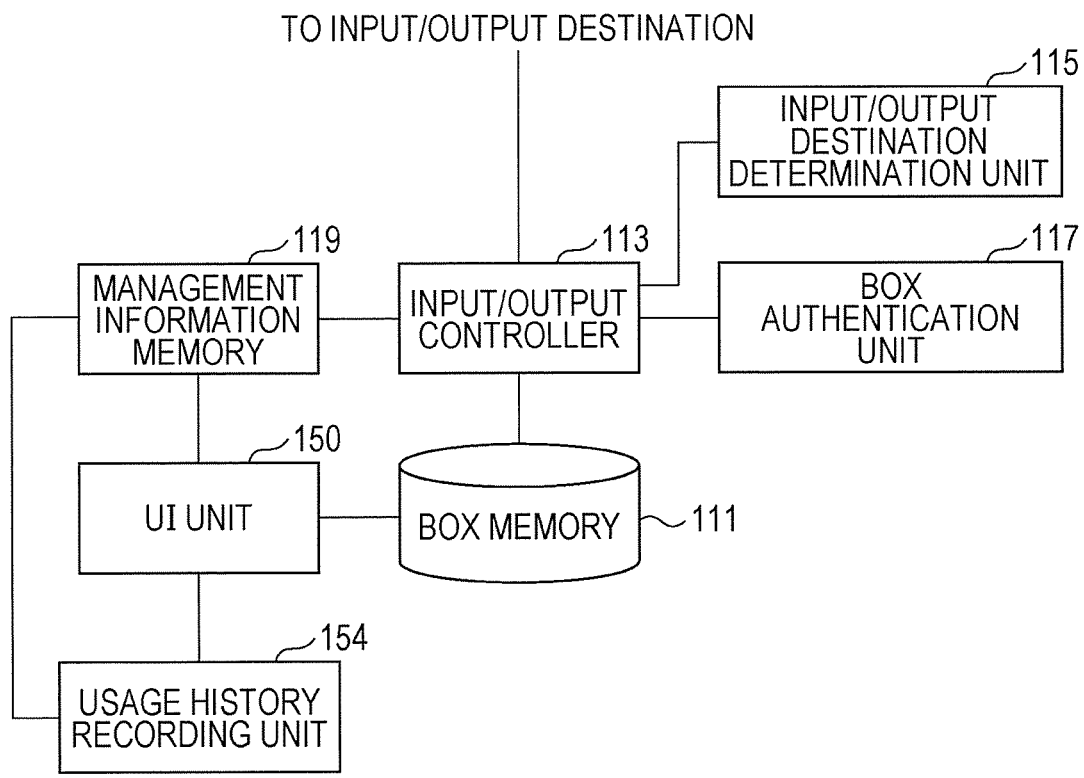
FIG. 20 is a diagram illustrating an example of a group management table according to a second modification.
FIG. 21 is a diagram illustrating an example of a user information table according to the second modification.
FIG. 22 is a diagram illustrating an example of the functional configuration of the main controller according to a third modification.

On receipt of an instruction from a user to execute a function (such as scanning) that involves storage of a document in a box, the UI unit 150 determines a group to which the user belongs from the user information table (see FIG. 21), and identifies a network available to that group from the group management table (see FIG. 20). The UI unit 150 refers to the identified information and the box input/output information of each box (such as the box management table (see FIG. 12)), and identifies a box from which a document is permitted to be output to a network available to that user as a box suitable as a document storage destination for that user. The UI unit 150 provides, as a UI screen for selecting a box that serves as a storage destination, a screen that distinguishably displays one or more boxes from which a document is permitted to be output via a network available to that user from other boxes.

Third Modification

In a third modification, the UI unit 150 uses a user's past history of using a box to control displaying of a box serving as a candidate for a storage destination on a UI screen for selecting the current document storage destination. To do so, the main controller 110 includes a usage history recording unit 154, which records each user's history of using a box, as illustrated in FIG. 22.

Figures 23, 24, 25:
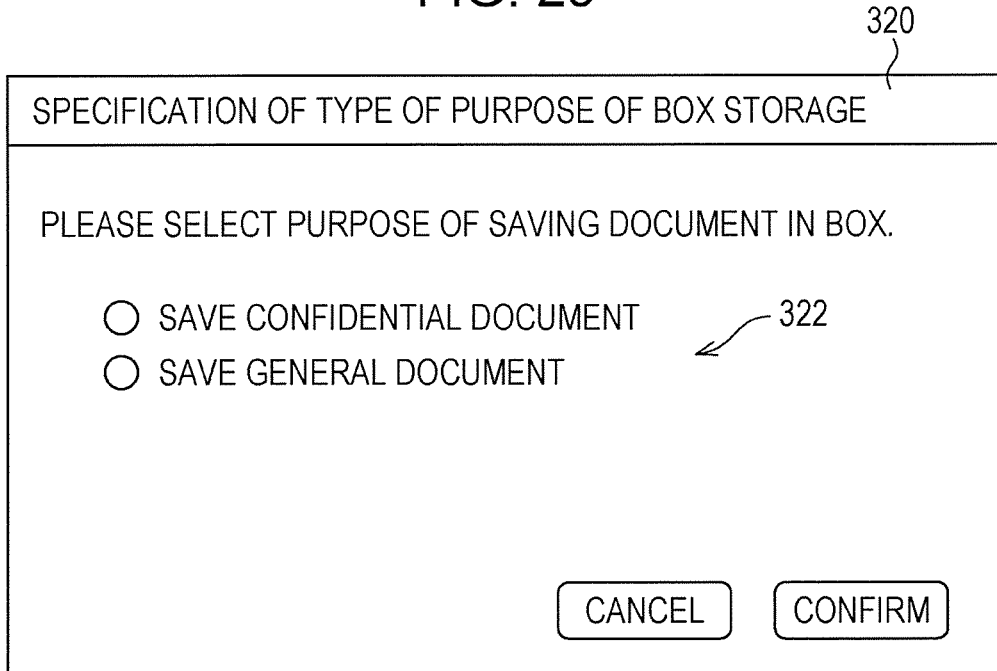
FIG. 23 is a diagram illustrating an example of the user management table according to the third modification.
FIG. 24 is a diagram illustrating an example of settings of the type of purpose of each network according to a fourth modification.
FIG. 25 is a diagram illustrating an example of a screen for selecting the type of purpose of box storage according to the fourth modification.

In one example, the usage history recording unit 154 records, for each user, information on a box that the user last used. For example, as illustrated in FIG. 23, the user management table in the management information memory 119 has, in addition to information on a network available to each user, the item "box (that the user) last used". Every time a user uses a box, the usage history recording unit 154 updates the item "box last used" of the user in the user management table to the currently used box.

Note that what type of operation is regarded as "use" in the history of using a box is set in advance. For example, storage of a document in a box may be regarded as "use", an output or retrieval of a document in a box may be regarded as "use", or both of them may be regarded as "use". In addition, an operation of opening a box (that is, an operation of displaying a screen that shows a list of documents saved in a box) may be included in the range of "use".

In this example, on receipt of an instruction from a user to execute a function that involves storage of a document in a box, the UI unit 150 determines, from information of the user management table and the box management table (FIG. 13) of the above-described exemplary embodiment, boxes suitable as a storage destination for that user, which are displayed on the UI screen. The UI unit 150 displays, on the UI screen on which the determined "boxes suitable as a storage destination for the user" are arranged as options, the "box (that the user) last used" (that is, the box that the used "last time" in view of the current storage) in a way distinguishable (such as to stand out) from other options. For example, the "box last used" may be displayed in a color different from the other boxes, or may be displayed with emphasis using a special mark or with higher luminance than the other boxes, or using a combination of them.

In another example, the usage history recording unit 154 records, for each user, history information indicating when and which box the user has "used" (what type of operation is regarded as "use" has been set as described above). The UI unit 150 refers to a user's history information in the case of generating a UI screen for selecting a document storage destination for the user. That is, as in the above-described exemplary embodiment, the UI unit 150 identifies boxes suitable as a storage destination, and, in the case of displaying a list of a group of the identified boxes, displays, for example, a box that the user most often uses with emphasis, which is obtained from the history information. Alternatively, the UI unit 150 displays a group of the identified boxes in the order of the frequency of use.

Fourth Modification

In a fourth modification, a user is prompted to select the purpose of saving a document in a box, and boxes that serve as storage destination options are narrowed down in accordance with the purpose.

To do so, as illustrated by way of example in FIG. 24, in the management information memory 119, for each network (which is identified by the identification name of a corresponding network interface) to which the MFP 100 is connected, the type of purpose of the network is registered. The purpose of the network here is the purpose of using a group of documents handled on that network. Several types of purposes of the network are prepared, such as "for confidential documents" and "for general documents", and one or more types among these types are associated with each network.

In response to an instruction from a user to save a document in a box, the UI unit 150 presents to the user a purpose selecting screen 320, which is illustrated by way of example in FIG. 25, and prompts the user to select on that screen the type of purpose of saving a document. The purpose selecting screen 320 indicates a purpose type option group 322, and the user selects the current purpose from the option group. The UI unit 150 identifies boxes suitable as a storage destination for the user from the user management table (FIG. 12) and the box management table (FIG. 13). The UI unit 150 extracts, from the identified group of boxes, only one or more boxes that have a network associated with the type of purpose selected by the user as an output-permitted path, and presents to the user a screen for selecting the storage destination from among the extracted boxes serving as options.

Although the exemplary embodiment and modifications according to the present disclosure have been described so far, the exemplary embodiment and modifications are merely one example of realizing the present disclosure.

The main controller 110 of the MFP 100 discussed by way of example above may be realized by, for example, causing a computer included in the MFP 100 to execute a program that represents the functions of the function modules in each apparatus. Here, the computer has a circuit configuration in which, for example, as hardware, a processor such as a central processing unit (CPU), memory (primary storage) such as random-access memory (RAM) and read-only memory (ROM), a hard disk drive (HDD) controller that controls an HDD, various input/output (I/O) interfaces, and a network interface that controls connection with a network such as a LAN are connected via bus. In addition, for example, a disk drive for reading and/or writing data from/to removable disk recording media such as a compact disc (CD) and a digital versatile disc (DVD), a memory reader/writer for reading and/or writing data from/to removable non-transitory recording media of various standards such as flash memory, and so forth may be connected to the bus via an I/O interface. A program describing the details of processing of the function modules discussed above by way of example is saved in a fixed storage device such as an HDD via a recording medium such as a CD or a DVD or via communication means such as a network, and installed in a computer. The program stored in the fixed storage device is read out to RAM and executed by a processor such as a CPU, thereby realizing a group of the function modules discussed above by way of example.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a plurality of network interfaces connected to corresponding networks;
a plurality of storage areas for saving data, for each of which a network interface permitted as an output path of the saved data is defined; and
a processor, configured to
obtain network information indicating a network available to a group to which each user belongs; and
present to a user a list of storage areas selectable as a data storage destination, and present a list of storage areas for which a network interface connected to a network available to the group to which the user belongs, which is indicated by the network information, is defined as the output path.

2. The information processing apparatus according to claim 1, wherein, in a case where no network available to the group to which the user belongs is registered in the network information, the processor is configured to present to the user a storage area for an unregistered user as a storage area selectable as a data storage destination.

3. The information processing apparatus according to claim 2, wherein the processor is further configured to
generate, in a case where no network available to the group to which the user belongs is registered in the network information, the storage area for an unregistered user,
wherein the processor is configured to present to the user the storage area for an unregistered user generated by the processor.

4. The information processing apparatus according to claim 3, wherein the processor is further configured to
delete the storage area for an unregistered user generated by the generating unit after use of the storage area has ended.

5. The information processing apparatus according to claim 3, wherein:
a network for an unregistered user is determined in advance, and
the processor is further configured to define a network interface connected to the network for an unregistered user as an output path of data stored in the generated storage area for an unregistered user.

6. The information processing apparatus according to claim 1, wherein:
the processor is further configured to obtain information indicating the group to which each user belongs, and the network information indicates a network available to each group, and
the processor is further configured to determine, from the network information, a network available to the group to which the user belongs, and presents a list of storage areas for which a network interface connected to the determined network is defined as the output path.

7. The information processing apparatus according to claim 1, further comprising:
the processor is further configured to record information on a storage area that the user used in the past,
wherein the processor is further configured to control an order or a mode of displaying storage areas in the list on the basis of the information on a storage area that the user used in the past, which is recorded in the recording unit.

8. The information processing apparatus according to claim 1, wherein:
for each of the plurality of storage areas, a network interface permitted as an input path of data to be saved in the storage area is defined, and
in a case where the user is accessing the information processing apparatus via a network, the presenting unit presents a list of storage areas for which a network interface connected to the network via which the user is accessing is defined as the input path and for which a network interface connected to a network available to the group to which the user belongs, which is indicated by the network information, is defined as the output path.

9. The information processing apparatus according to claim 1, wherein:
a type of purpose is associated with each network,
the information processing apparatus further comprises a unit that accepts an input of a type of purpose of saving data, and
the presenting unit presents a list of storage areas for which a network interface connected to a network that is available to the group to which the user belongs, which is indicated by the network information, and that is associated with the accepted type of purpose is defined as the output path.

10. A non-transitory computer readable medium storing a program causing a computer including a plurality of network interfaces connected to corresponding networks to:
Provide a plurality of storage areas for saving data, for each of which a network interface permitted as an output path of the saved data is defined;
obtain network information indicating a network available to a group to which each user belongs; and
present to a user a list of storage areas selectable as a data storage destination, and present a list of storage areas for which a network interface connected to a network available to the group to which the user belongs, which is indicated by the network information, is defined as the output path.

11. An information processing apparatus comprising:
a plurality of network interfaces connected to corresponding networks;
a plurality of storage areas for saving data, for each of which a network interface permitted as an output path of the saved data is defined;
obtaining means for obtaining network information indicating a network available to a group to which each user belongs; and
presenting means for presenting to a user a list of storage areas selectable as a data storage destination, the presenting means presenting a list of storage areas for which a network interface connected to a network available to the group to which the user belongs, which is indicated by the network information, is defined as the output path.

* * * * *